UNITED STATES PATENT OFFICE.

JOSEPH L. TURNER, OF PHILADELPHIA, PENNSYLVANIA, AND CHARLES E. VANDERKLEED, OF COLLINGSWOOD, NEW JERSEY, ASSIGNORS TO H. K. MULFORD COMPANY, OF PHILADELPHIA, PENNSYLVANIA, A CORPORATION OF PENNSYLVANIA.

PROCESS OF PREPARING NITRILS OF AROMATIC ALPHA-OXYACIDS.

No. 895,316.     Specification of Letters Patent.     Patented Aug. 4, 1908.

Application filed July 22, 1907. Serial No. 384,976.

*To all whom it may concern:*

Be it known that we, JOSEPH L. TURNER, a subject of the Czar of Russia, and CHARLES E. VANDERKLEED, a citizen of the United States, residing, respectively, in Philadelphia, Pennsylvania, and Collingswood, New Jersey, have invented certain Improvements in Processes of Preparing Nitrils of Aromatic Alpha-Oxyacids, of which the following is a specification.

Our invention relates to the production of certain new substances which are chemically cyanhydrins of protocatechuic aldehyde or of its monomethyl ether, dimethyl ether, or the like, corresponding to the chemical formula

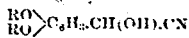

in which formula R stands for a hydrogen atom, which may be replaced by an alkyl group.

The object of our invention is to provide a process for the production of the above noted chemical substances, which are colorless compounds, soluble in alcohol and less readily soluble in ether. When heated with alkalies or acids, these nitrils are decomposed into the corresponding alpha-oxy-acids and ammonia, and as intermediary products the corresponding amids may be formed.

The process of producing the new compounds consists in treating the above mentioned protocatechuic aldehyde or its ethers with sodium bisulfite in such a manner as to produce an addition compound, which in turn is reacted upon with potassium cyanid, preferably in solution.

As a specific example of the process, 100 grams of protocatechuic aldehyde are warmed to 60° C. for one hour in a water bath with 500 c. c. of a concentrated (40%) solution of sodium bisulfite. As a consequence, the protocatechuic aldehyde goes into solution and the bisulfite addition compound separates. This latter is then filtered off and freed from the liquid as far as possible with the aid of a suction pump. It is then triturated with a small volume of water, and a solution of 80 grams of potassium cyanid in 150 c. c. of water is added.

The crystals of the sodium bisulfite-protocatechuic-aldehyde readily go into solution, and upon cooling, the nitril of the alpha-oxy-homoprotocatechuic acid crystallizes out.

The reaction occurring may be represented as follows:—

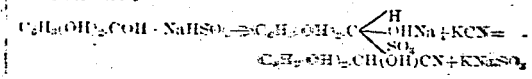

As another specific application of our process, 100 grams of vanillin are warmed on a water bath with 500 c. c. of a concentrated solution of sodium bisulfite for a period of one hour. Under these conditions the crystals of vanillin go into solution, and there is precipitated an addition compound of sodium bisulfite and vanillin. On cooling there is formed a semi-solid mass of crystals which are filtered off under pressure. These crystals are then triturated with a little water, after which there is added a solution of 80 grams of potassium cyanid in 150 c. c. of water. The crystals of the bisulfite-vanillin then go into solution and on the surface of the mixture there separates in a state of sufficient purity, a thick oily liquid, which is the nitril of alpha-oxy-homo-vanillic acid.

We claim:—

1. The process of preparing nitrils of aromatic alpha-oxy-acids which consists in reacting upon a pyrocatechol derivative with sodium bisulfite, and reacting upon the resulting compound with a cyanid, substantially as described.

2. The process of preparing nitrils of aromatic alpha-oxy-acids which consists in reacting upon a pyrocatechol derivative with sodium bisulfite in such manner as to form an addition compound, and then reacting upon said compound with a cyanid, substantially as described.

3. The process of preparing nitrils of aromatic alpha-oxy-acids which consists in adding 100 grams of a pyrocatechol derivative to 500 c. c. of a concentrated solution of sodium bisulfite, heating the same, adding 80 grams of potassium cyanid in 150 c. c. of water, and separating out the resulting nitril formed, substantially as described.

In testimony whereof, we have signed our names to this specification, in the presence of two subscribing witnesses.

JOSEPH L. TURNER.
CHARLES E. VANDERKLEED.

Witnesses:
WILLIAM E. BRADLEY,
JOS. H. KLEIN.